United States Patent
Fadurdo Orellana et al.

(10) Patent No.: US 11,840,024 B2
(45) Date of Patent: Dec. 12, 2023

(54) SACRIFICIAL BARRIERS

(71) Applicant: HEWLETT-PACKARD DEVELOPMENT COMPANY, L.P., Spring, TX (US)

(72) Inventors: Roger Fadurdo Orellana, Sant Cugat del Valles (ES); Pol Fornos Martinez, Sant Cugat del Valles (ES); Salvador Sanchez Ribes, Sant Cugat del Valles (ES); Ismael Fernandez Aymerich, Sant Cugat del Valles (ES); Manuel Freire Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/284,712

(22) PCT Filed: Apr. 23, 2019

(86) PCT No.: PCT/US2019/028725
§ 371 (c)(1),
(2) Date: Apr. 12, 2021

(87) PCT Pub. No.: WO2020/219027
PCT Pub. Date: Oct. 29, 2020

(65) Prior Publication Data
US 2021/0379836 A1  Dec. 9, 2021

(51) Int. Cl.
B29C 67/00 (2017.01)
B29C 64/40 (2017.01)
(Continued)

(52) U.S. Cl.
CPC .............. *B29C 64/40* (2017.08); *B22F 10/14* (2021.01); *B22F 10/85* (2021.01); *B22F 12/55* (2021.01);
(Continued)

(58) Field of Classification Search
CPC .......... B22F 10/85; B22F 12/55; B29C 64/40; B29C 64/165; B29C 64/393; B33Y 10/00; B33Y 30/00; B33Y 50/00; B33Y 50/02
See application file for complete search history.

(56) References Cited

U.S. PATENT DOCUMENTS

2017/0157831 A1* 6/2017 Mandel ................. B29C 64/106
2018/0162059 A1   6/2018 Hofmann
(Continued)

FOREIGN PATENT DOCUMENTS

JP        6389242 B2    8/2018
KR    20150135080 A    12/2015
(Continued)

*Primary Examiner* — Ryan M Ochylski
(74) *Attorney, Agent, or Firm* — Michael Dryja

(57) ABSTRACT

A system includes a controller to receive data corresponding to an object or slices of the object to be generated by a 3D printer, wherein the 3D printer includes an array of printhead nozzles to selectively eject a print agent on a layer of build material in a build chamber having a build chamber wall, the array of printhead nozzles spanning substantially the full width of the build chamber and moveable along a length of the build chamber. The controller to generate first print data used to generate layers of the object based on the received object data, and to generate second print data used to generate layers of a sacrificial barrier located between the object and the build chamber wall, the second print data is (Continued)

generated such that different parts of the sacrificial barrier are generated using a different plurality of nozzles of the array of printhead nozzles.

19 Claims, 4 Drawing Sheets

(51) Int. Cl.
*B33Y 30/00* (2015.01)
*B33Y 50/02* (2015.01)
*B29C 64/393* (2017.01)
*B29C 64/165* (2017.01)
*B22F 10/14* (2021.01)
*B22F 10/85* (2021.01)
*B22F 12/55* (2021.01)

(52) U.S. Cl.
CPC .......... *B29C 64/165* (2017.08); *B29C 64/393* (2017.08); *B33Y 30/00* (2014.12); *B33Y 50/02* (2014.12)

(56) References Cited

U.S. PATENT DOCUMENTS

2018/0361673 A1   12/2018   Hakkaku et al.
2019/0009368 A1   1/2019    Levine

FOREIGN PATENT DOCUMENTS

WO   WO-2018017072 A1   1/2018
WO   WO-2019027405 A1   2/2019

\* cited by examiner

SACRIFICIAL BARRIERS

BACKGROUND

Some additive manufacturing or three-dimensional printing systems selectively solidify portions of successive layers of a powdered build material. In some examples, selective solidification may be achieved by selectively applying an energy absorbing fusing agent over each formed layer of build material and applying a fusing energy to the build material layer to cause portions thereof on which fusing agent was printed to heat up sufficiently to melt, coalesce, sinter, or otherwise fuse, and then to solidify upon cooling. Other examples directly apply energy in a point-to-point manner to portions of each layers to be solidified, for example using a laser.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1:
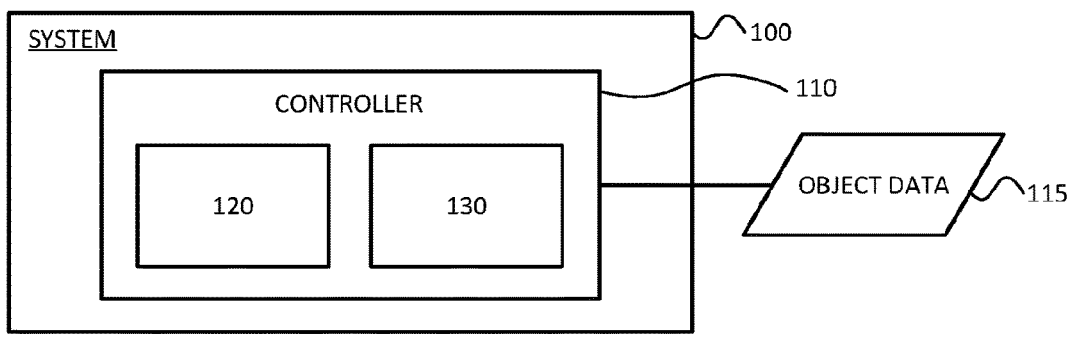
FIG. 1 is a schematic diagram showing an example of a system to generate sacrificial barriers.

The following description is directed to various examples of additive manufacturing, or three-dimensional printing, apparatus and processes to generate high quality 3D objects. While a limited number of examples have been disclosed, those skilled in the art may appreciate numerous modifications and variations therefrom. It is intended that the appended claims cover such modifications and variations as fall within the scope of the claims. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Some examples of additive manufacturing comprise a build bed of build material on a build platform to move within a build unit with rigid walls. The build material movement may cause friction to the build unit rigid walls that may lead to agitation of the build material of the build bed. This agitation may cause defects in the object to be generated.

In other examples, once the build bed has been printed with the objects to be generated, it may be cooled down to separate the non-fused build material from the generated objects. The cooling process may take some hours in which the full build unit is used for cooling purposes. Some additive manufacturing systems comprise cooling stations that may host the build bed so that the build bed cools down away from the build unit, thereby freeing the build unit for use in additional print jobs. In some examples, the transfer of the build bed from the build unit to the cooling station may be done through an open top of the build unit with the aid of the build platform. The build material movement may push up the build material into a container and thereby cause friction to the build unit rigid walls that may also lead to agitation of the build material of the build bed that may cause defects in the generated object.

In some examples, the additive manufacturing system may generate protective barriers between the rigid walls of the chamber and the objects to mitigate the effect of the agitation of build material due to the friction of the build bed with the rigid walls of the build chamber. Alternatively, some of the protective barriers are part of a printed protective box enclosing the generated objects.

Some additive manufacturing systems' selective solidification may be achieved by selectively applying an energy absorbing fusing agent over each formed layer of build material. Other additive manufacturing systems may apply other printing fluids, such as, UV binders or thermal binding agents. To optimize the usage of the printing bed to generate as many objects as possible, it may be wanted to minimize the area that the protective barriers occupy, thereby straight barriers parallel to the build unit rigid walls are used in some examples.

In some examples, the energy absorbing fusing agent is propelled through nozzles from an array of printhead nozzles of a carriage. The carriage may be a scanning carriage spanning substantially the full width of the build bed and to move along substantially the full length of the build bed. In these examples, a protective barrier may be generated at a location parallel to the length of a build unit wall. The printing agent to generate this protective barrier may be propelled through a small subset of nozzles from the array of nozzles. In the examples in which the protective barrier height spans substantially the full height of the build bed, the small subset of nozzles may be active throughout the entire printing job, or may be active above a recommended threshold.

In some examples, each of the printhead nozzles is associated with a resistor which heats a quantity of printing agent causing the generation of a bubble of air that ejects a discrete amount (e.g. a drop) of printing agent from the nozzle to a layer of the build bed. Each ejection of a drop of printing agent is known as a pulse. The lifespan of a nozzle may be determined by the amount of pulses it performs in the nozzle lifetime. The resistor generates the bubble of air upon receiving an electrical current that heats the resistor. The lifespan of a nozzle may also be affected by the temperature it reaches during use. The higher the frequency of use of a resistor, the higher its temperature, and the more the resistor may be degraded. Thus, excessive use of a printhead resistor may lead to a reduction of the lifespan of the resistor, which may in turn reduce the lifespan of the printhead. In some examples, the array of printhead nozzles may have to be replaced as soon as a single nozzle needs to be replaced.

Suitable powder-based build materials for use in examples herein may include, where appropriate, at least one of polymers, crystalline plastics, semi-crystalline plastics, polyethylene (PE), polylactic acid (PLA), acrylonitrile butadiene styrene (ABS), amorphous plastics, polyvinyl alcohol plastic (PVA), polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Example blended build materials include alumide, which may include a blend of aluminum and polyamide. Some additive manufacturing systems use build material in, for example, a powdered or granular form. A suitable material may be Nylon 12, which is available, for example, from Sigma-Aldrich Co. LLC. Another suitable material may be PA 2200 which is available from Electro Optical Systems EOS GmbH. Other examples of suitable build materials may include PA12 build material commercially known as V1R10A "HP PA12" available from HP Inc, PA11, TPU, or any other suitable polymeric build material. In yet other examples the build material may be any suitable metallic or ceramic build material.

Different powders may have different characteristics, such as different average particle sizes, different minimum and maximum particle sizes, different coefficients of friction, different angle of repose, and the like. In some examples non-powdered build materials may be used such as gels, pastes, and slurries. Additionally, or alternatively from the above, some examples build materials may be formed from, or may include, short fibers that may, for example, have been cut into short lengths from long strands or threads of material.

Referring now to the drawings, FIG. 1 shows a schematic diagram of an example system 100 to generate sacrificial barriers. The system 100 may comprise a controller 110 to generate control data. The system 100 may be external (i.e. located outside) from a three-dimensional (3D) printer. In some examples, the system 100 may be a computer program that may have other functions (i.e., capabilities) than the ones disclosed herein. In other examples, the system 100 may be included in the 3D printer. Examples of the 3D printer in which an object or plurality of objects are to be generated are disclosed below.

The controller 110 may be any combinations of hardware and programming that may be implemented in a number of different ways. For example, the programming of modules may be processor-executable instructions stored on at least one non-transitory machine-readable storage medium and the hardware for modules may include at least one processor to execute those instructions. In some examples described herein, multiple modules may be collectively implemented by a combination of hardware and programming, as described above. In other examples, the functionalities of the controller 110 may be, at least partially, implemented in the form of electronic circuitry.

The controller 110 may receive data 115 corresponding to an object to be generated or a plurality of slices of the object to be generated by a 3D printer. The data 115 to print the object may be derived from a 3D object model of the object. In an example, the 3D object model may be a Computer Aid Design (CAD) file. The data 135 may, in an example, comprise a plurality of 2D slices corresponding to virtual cross sections of the object to be generated. Each slice may correspond to a physical build material layer. The 3D object model may be defined in a vector-type format in which 2D rasterized images may be generated from each slice of the object model. The data 115 may also comprise instructions or data indicating which locations of the build material layer are to be treated, e.g. solidified, to generate the object.

The controller 110 is to generate first print data 120 to be used to generate a plurality of layers of the object based on the received object data 115. In an example in which the object data 115 comprises the object to be generated, the controller 110 may slice the object into a plurality of slices corresponding to a plurality of physical layers of build material from which the object is to be generated. In another example in which the object data 115 comprises the object to be generated, the controller 110 may not slice the object. In another example, the object data 115 comprises a plurality of slices corresponding to the object to be generated.

The controller 110 is to generate second print data 130 to be used to generate a plurality of layers of a sacrificial barrier to be located between the object and at least one build chamber wall. A sacrificial barrier may be any object or structure that is to be discarded at the end of the printing operation. A sacrificial barrier is not part of an object, or set of objects, defined by the received object data 115, but is an additional object that is used for a specific purpose during generation of the object(s). Sacrificial structures may, for example, be used to enhance the quality of the object(s) to be generated.

In some examples, a horizontal cross-section of a sacrificial barrier may comprise a plurality of patterns with a predetermined thickness. In other examples, a horizontal cross-section of a sacrificial barrier may comprise a pattern with variable thicknesses. A plurality of examples of horizontal cross-section patterns are disclosed below with reference to further examples of the present disclosure. Additionally, a sacrificial barrier may span substantially the full height of a build bed. Alternatively, a sacrificial barrier may span a subset of the full height of a build bed. In some examples the thickness of a horizontal cross-section of a sacrificial barrier may be selected from the range defined from 0.5 cm to 20 cm. In other examples, the thickness of a horizontal cross-section of a sacrificial barrier may be selected from the range defined from 0.5 cm to 10 cm. In yet other examples, the thickness of a horizontal cross-section of a sacrificial barrier may be selected from the range defined from 1 cm to 5 cm. Additionally, or alternatively, the sacrificial barrier may have holes therethrough of non-treated (e.g., non-fused, non-solidified) build material.

The controller 110 may generate the second print data 130 in such a way that different parts of the sacrificial barrier are to be generated using a different plurality of the array of printhead nozzles. This may reduce the amount of time that a nozzle is used to generate the sacrificial barrier (i.e., a single nozzle may not print the whole sacrificial barrier). This may also reduce the duty-cycle of a nozzle to generate the sacrificial barrier. The controller 110 may generate the second control data 130 to use a different plurality of the array of printhead nozzles, to spread the generation of the sacrificial barrier across multiple nozzles, to reduce the wear on any single nozzle.

Figure 2A:
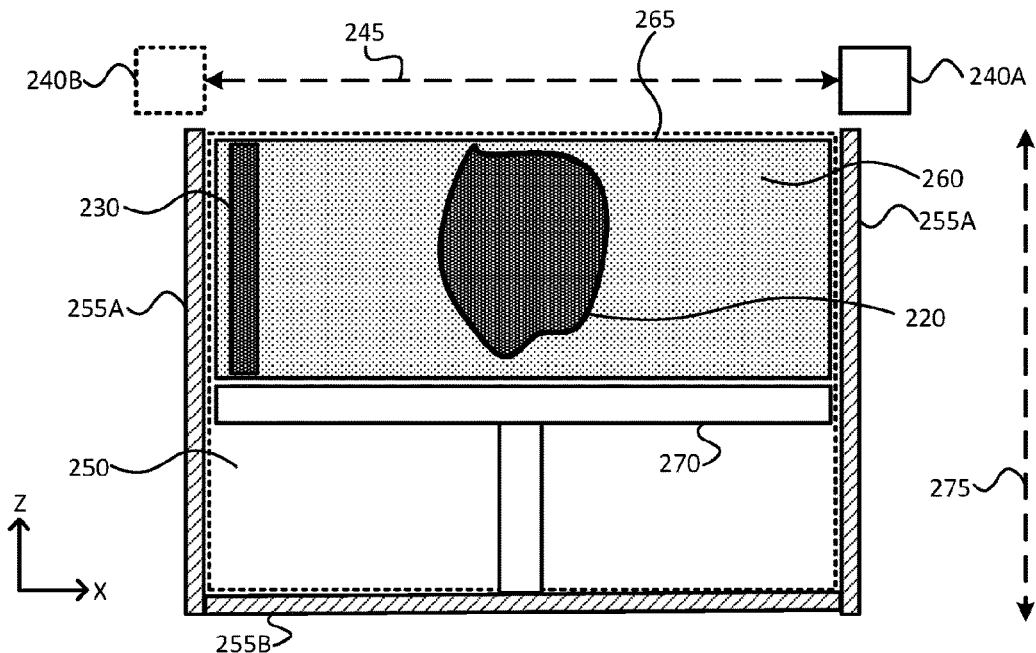
FIG. 2A is a schematic diagram showing an example of a front view of an additive manufacturing system.
Figure 2B:
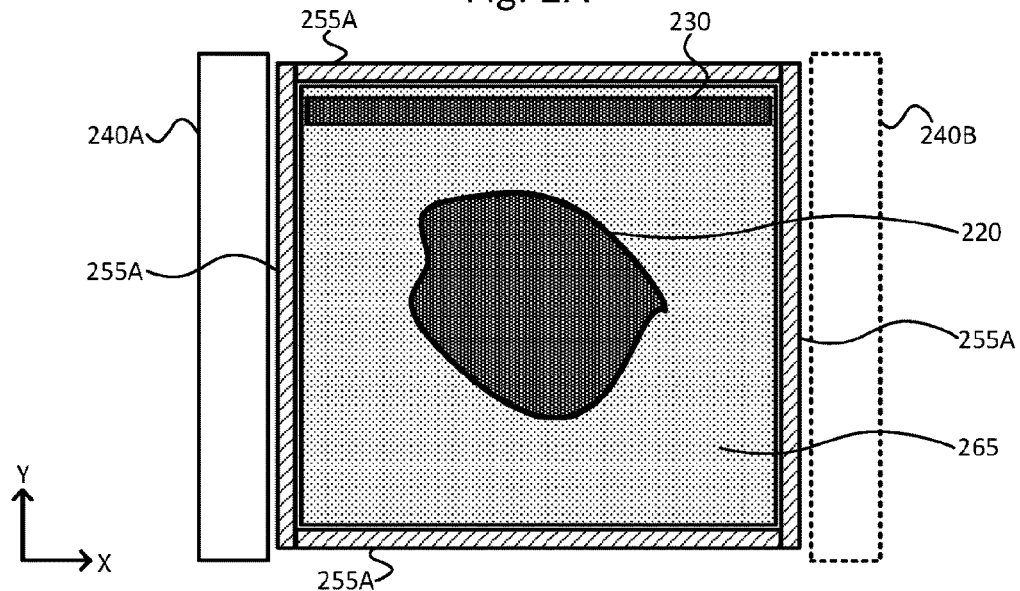
FIG. 2B is a schematic diagram showing an example of a top view of an additive manufacturing system.

FIGS. 2A and 2B are a schematic diagram showing an example of an additive manufacturing system. FIG. 2A shows an example of a front view of a cross-section corresponding to the middle of a portion of the additive manufacturing system. FIG. 2B shows an example of a top view of a portion of the additive manufacturing system.

Examples herein comprise a build unit comprising substantially vertical rigid build chamber walls 255A, and at least one substantially horizontal rigid build chamber wall 255B. The volume between walls 255A-B from the build unit defines a build chamber 250, illustrated in dotted lines for clarity. At the start of the process, the build chamber 250 may not comprise build material. In use, however, the build chamber 250 comprises a build bed 260 comprising build material, in which the object 220 and the sacrificial barrier 230 may be generated. The build chamber 250 comprises a build platform 270 therein. The build platform 150 is moveable within the build chamber 250. In an example, the build platform 270 is to move substantially vertically, for example the build platform 270 may move along the height axis Z (also illustrated as a vertical dotted arrow 275). The build platform 270 may be placed in a high position at the beginning of the printing operation and may be lowered a vertical distance corresponding to the thickness of each layer to be formed. In some examples, the thickness of the subsequent layer may be in the range of about 40 microns to 120 microns, for example 80 microns. In other examples, the thickness of the subsequent layer may be in the range of about 60 microns to 170 microns, for example 130 microns. The build chamber 250 may, for example, be a generally open cuboid structure in which the build platform 270 forms a vertically movable base. In an example, the build chamber 250 is part of a removable build unit that may be removed from the additive manufacturing apparatus 100 after the generation of the object. In another example, the build chamber 140 is integrated into the additive manufacturing system.

The additive manufacturing system, or 3D printer, may also comprise an array of printhead nozzles 240A to selectively eject a print agent on a layer of build material in a build chamber 250 having at least one build chamber wall. In an example, the additive manufacturing system may comprise an array of printhead nozzles 240A to selectively eject a print agent (e.g., energy absorbing fusing agent) on the top layer 265 of the build bed 260 in the build chamber 250. In some examples, the build chamber 250 may have a single wall 255A. In other examples, the build chamber may have a plurality of walls 255A-B.

The array of printhead nozzles 240A is to span substantially the full width of the build chamber (indicated by the width axis Y in FIG. 2B). The array of printhead nozzles 240A is moveable along the length of the build chamber (indicated by the length axis X in FIG. 2A-B). The array of printhead nozzles is moveable from a first end 240A to a second end 240B (indicated as dotted lines for clarity). A subset of nozzles from the array of printhead nozzles 240A may eject printing fluid to generate the sacrificial barrier 230 as the array of printhead nozzles 240A moves from the first end 240A to the second end 240B or from the second end 240B to the first end 240A.

The additive manufacturing system may receive data from the controller 110 from FIG. 1 (not shown). The data sent by the controller 110 may include the first data 120 and the second data 130. The additive manufacturing system may generate the object 220 based on the first print data 120 and may generate the sacrificial barrier 230 based on the second print data 130. In some examples, the sacrificial barrier 230 and the object 220 may be generated simultaneously, by ejecting the print agent in different parts of the top layer 265 of the build bed 260.

As mentioned above, the second data 130 may comprise data corresponding to the generation of the sacrificial barrier 230. In some examples, the sacrificial barrier 230 is to enclose at least in part the object 220 to be generated. In further examples, the sacrificial barrier 230 may be part of a box enclosing the object 220 to be generated.

Figure 3B:
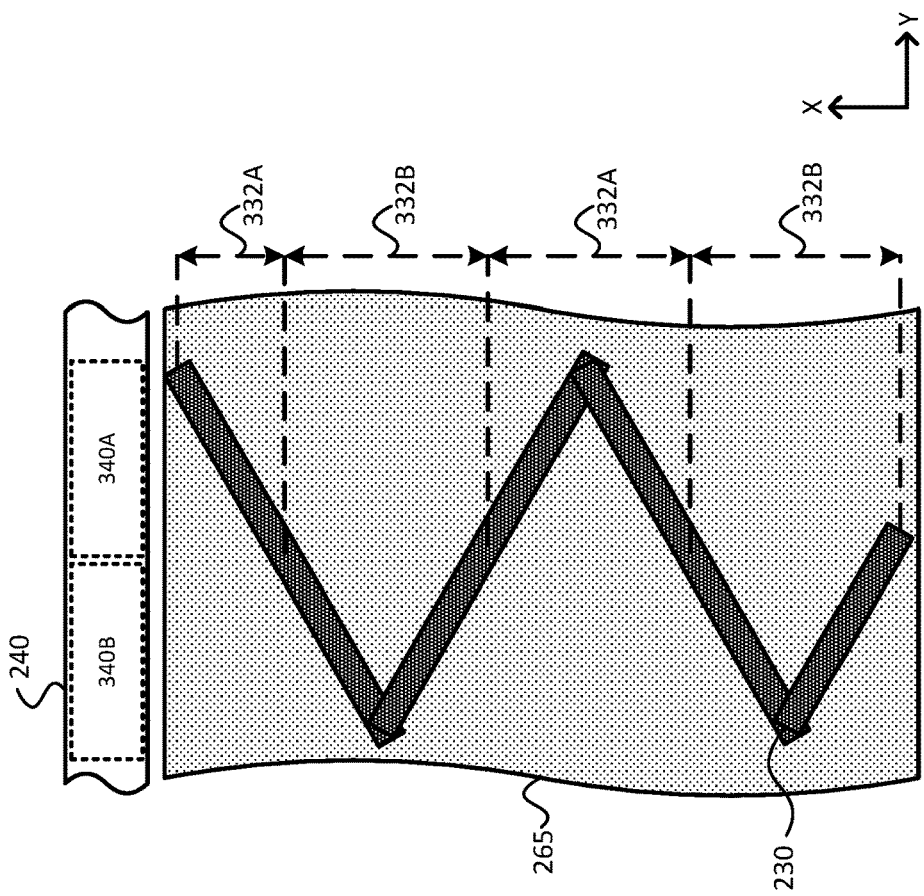
FIG. 3B is a schematic diagram showing an example of a part of a cross-section of a sacrificial barrier.
Figure 3A:
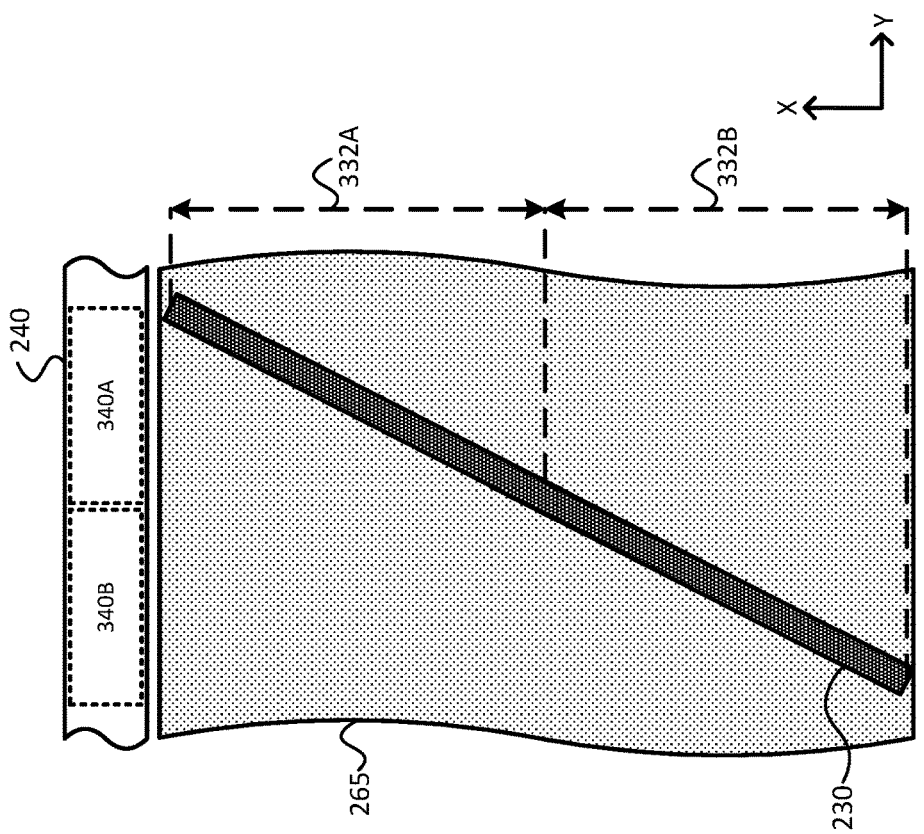
FIG. 3A is a schematic diagram showing an example of a part of a cross-section of a sacrificial barrier.

FIG. 3A is a schematic diagram showing an example of a part of a cross-section of a sacrificial barrier on a part of a build material layer from a build bed.

In an example, the illustrated cross-section of the sacrificial barrier 230 may be a cross section of the sacrificial barrier 230 in the build material layer 265 from the build bed 260. The sacrificial barrier 230 may comprise a plurality of parts (i.e. sections) with respect to the horizontal plane (plane XY), for example, a first part 332A and a second part 332B. For simplicity two parts have been drawn, however the sacrificial barrier 230 may comprise any number of parts.

As mentioned above with regards to FIGS. 2A and 2B, the sacrificial barrier 230 is generated by the array of printhead nozzles 240. More precisely, the illustrated part of the sacrificial barrier 230 is generated by a first set of nozzles 340A and a second set of nozzles 340B from the array of printhead nozzles 240. The first set of nozzles 340A and the second set of nozzles 340B are a different set of nozzles from the array of printhead nozzles 240. In the examples herein, the term "a set of nozzles" should be interpreted as including a single nozzle, or a plurality of nozzles, therefore the first set of nozzles 340A may comprise either a single nozzle, or a plurality of nozzles. For simplicity two sets of nozzles have been drawn, however there may be more than two sets of nozzles that are to generate the sacrificial barrier 230 in the layer 265.

The controller 110 (not shown) may generate the second control data 120 in such a way that a first part 332A of the sacrificial barrier 230 in a build material layer 265 is to be generated using a first set of nozzles 340A; and the second part 332B of the sacrificial barrier 230 in the build material layer 265 is to be generated using the second set of nozzles 340B. Therefore, the nozzles from the first set of nozzles 340A may not propel printing agent corresponding to the second part 332B from the sacrificial barrier 230, and the nozzles from the second set of nozzles 340B may not propel printing agent corresponding to the first part 332A from the sacrificial barrier 230. Hence, as the printhead is scanned over the length of the print bed, different nozzles are used to print different portions of the sacrificial barrier 230.

In an example, the controller 110 is to generate the second control data 120 to generate the sacrificial barrier 230 having a cross-section in the form of a triangle wave. In another example, the controller 110 is to generate the second control data 120 to generate the sacrificial barrier 230 having a cross-section in the form of a line that is not parallel to the length X axis (see, e.g., illustrated example in FIG. 3A). In another example, the controller 110 is to generate the second control data 120 to generate the sacrificial barrier 230 having a cross-section in the form of a sinewave. In another example, the controller 110 is to generate the second control data 120 to generate the sacrificial barrier 230 having a cross-section in the form of a square wave. In yet another example, the controller 110 is to generate the second control data 120 to generate the sacrificial barrier 230 having a cross-section in the form of a triangle wave, a sinewave, a square wave, or a combination thereof.

For a given mechanical properties requirement (e.g., resistance) of the sacrificial barrier 230, the selected geometry (i.e., pattern) of the cross-section of the sacrificial barrier 230 may determine the thickness of the sacrificial barrier 230. Different cross-sections' geometries may enable thinner sacrificial barriers 230. For example, for a given level of mechanical properties requirement, the width of a sacrificial barrier 230 whose cross-section is in the form of a triangle wave may be thinner than the width of a sacrificial barrier 230 whose cross-section is in the form of a line.

FIG. 3B is a schematic diagram showing another example of a part of a cross-section of a sacrificial barrier on a part of a build material layer from a build bed.

In the illustrated example, the cross-section of the sacrificial barrier 230 shows a cross section of the sacrificial barrier 230 in the build material layer 265 from the build bed 260. In the example, the controller 110 (not shown) is to generate the second control data 120 to generate the sacrificial barrier 230 having a cross-section in the form of a triangle wave.

The sacrificial barrier 230 may comprise a plurality of parts (i.e., sections) with respect to the horizontal plane (plane XY), for example, a first plurality of parts 332A and a second plurality of parts 332B. For simplicity two plurality of parts have been drawn, however the sacrificial barrier 230 may comprise any number of plurality of parts.

Additionally, the sacrificial barrier 230 is generated by the array of printhead nozzles 240. More precisely, the illustrated part of the sacrificial barrier 230 is generated by a first set of nozzles 340A and a second set of nozzles 340B from the array of printhead nozzles 240. For simplicity two sets of nozzles have been drawn, however there may be more than two sets of nozzles that are to generate the sacrificial barrier 230 in the layer 265.

The controller 110 may generate the second control data 120 in such a way that a first plurality of parts 332A of the sacrificial barrier 230 in the build material layer 265 is to be generated using a first set of nozzles 340A; and the second plurality of parts 332B of the sacrificial barrier 230 in the build material layer 265 is to be generated using the second set of nozzles 340B.

The distance between two consecutive vertexes of the triangle wave may indicate the number of nozzles involved (i.e., active) in building the sacrificial barrier 230. The more the distance between two consecutive vertexes of the triangle wave may involve more active nozzles in building the sacrificial barrier 230, thereby reducing the duty-cycle of the nozzles within the array of printhead nozzles 240.

Figure 4:
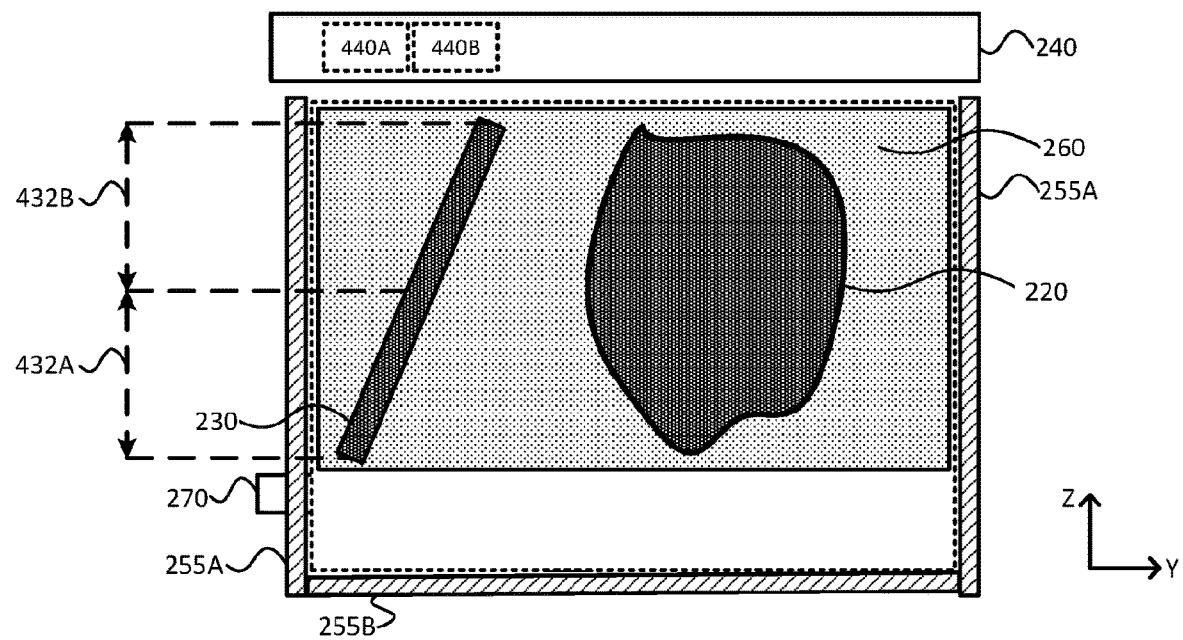
FIG. 4 is a schematic diagram showing an example of a front view of an additive manufacturing system.

FIG. 4 is a schematic diagram showing an example of a front view cross-section of the middle of an additive manufacturing system. The system from FIG. 4 may be the same as or similar to the system from FIGS. 2A and 2B. The system of FIG. 4 comprises the build unit with build chamber walls 255A-B, build platform 270, and build bed 260.

The controller 110 (not shown) may send data to the additive manufacturing system. The data sent by the controller 110 may include the first data 120 and the second data 130 to generate the object 220 and the sacrificial barrier 230 respectively.

The sacrificial barrier 230 may comprise a plurality of portions with respect to a vertical plane (e.g, plane XY), for example, a first portion 432A and a second portion 432B. The first portion 432A may correspond to a first set of build material layers and the second portion 432B may correspond to a second set of build material layers. The first set of layers are a different set of layers than the second set of layers. In the examples herein, a "set of layers" may comprise a single layer or a plurality of layers, thereby the first set of layers may include a single layer or a plurality of layers. For simplicity two portions have been drawn, however the sacrificial barrier 230 may comprise any number of portions.

As disclosed above, the sacrificial barrier 230 is generated by the array of printhead nozzles 240. More precisely, the sacrificial barrier 230 is generated by a first set of nozzles 440A and a second set of nozzles 440B from the array of printhead nozzles 240. For simplicity two sets of nozzles have been drawn, however there may be more than two sets of nozzles that are to generate the sacrificial barrier 230 in the build bed 260.

The controller 110 is to generate the second control data 130 to cause the first set of nozzles 440A to generate the first portion 432A of the barrier in a first set of build material layers (e.g., layers corresponding to the first portion 432A). The controller 110 is also to generate the second control data 130 to cause the second set of nozzles 440B to generate the second portion 432B of the barrier in a second set of build material layers (e.g., layers corresponding to the second portion 432B). Therefore, the nozzles from the first set of nozzles 440A may be inactive during the printing operation of the layers corresponding to the second portion 432B of the sacrificial barrier 230, and the nozzles from the second set of nozzles 440B may be inactive during the printing operation of the layers corresponding to the first portion 432A of the sacrificial barrier 230. This reduces the duty-cycle of the nozzles in order to reduce the wear on any single nozzle within the array of printhead nozzles 240.

Additionally, the controller 110 may generate the second control data 120 in such a way that the length of the cross-section of the sacrificial barrier 230 (e.g., plane XZ) from the first set of layers (e.g., layers corresponding to the first portion 432A), are longer than the length of the cross-section of the sacrificial barrier 230 in the second set of layers (e.g., layers corresponding to the second portion 432B). If the first set of layers are in a lower position with respect to a vertical axis (height Z axis) than the second set of layers, the fact that a barrier has a longer length in a higher part of the build bed 260, may provide a more stable architecture in the event that the build bed 260 is to be introduced in a cooling station.

Figure 5:
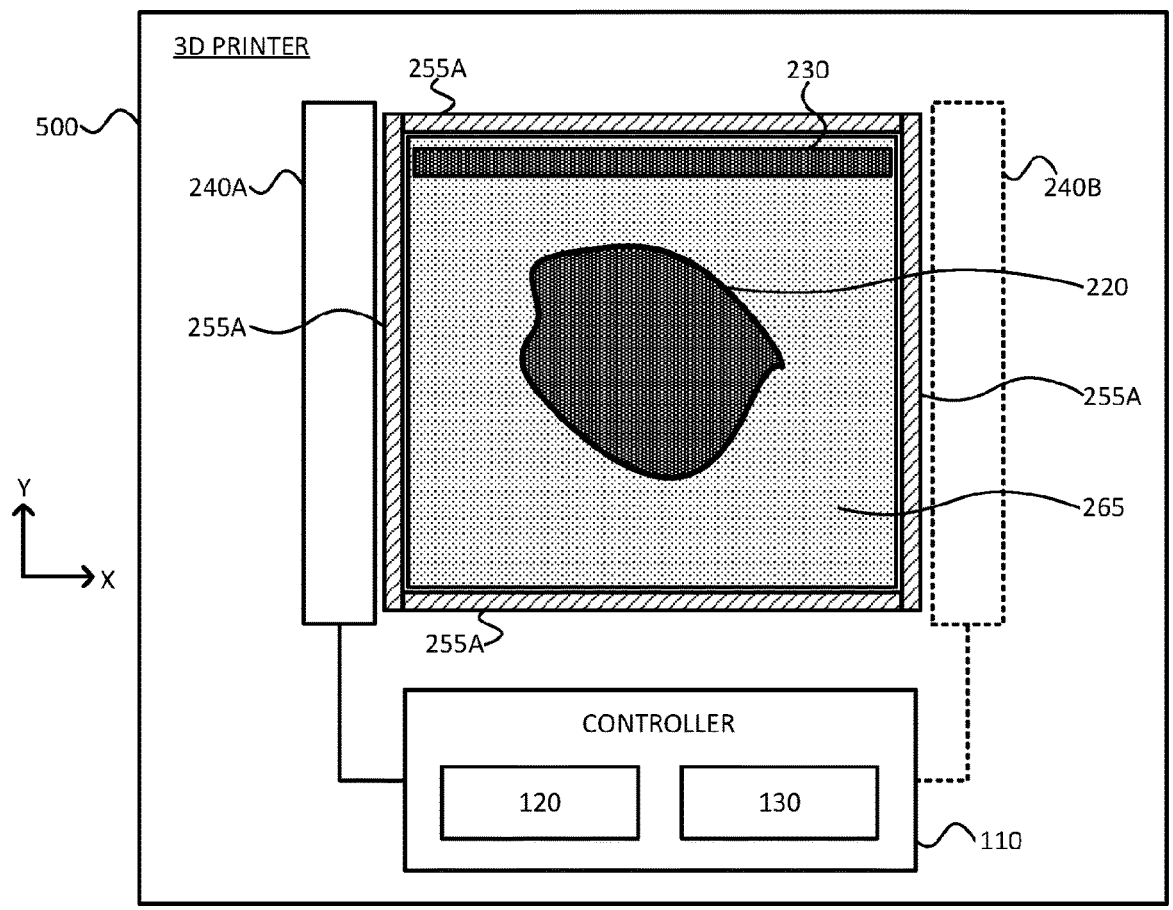
FIG. 5 is a schematic diagram showing an example of a three-dimensional printer.

FIG. 5 is a schematic diagram showing an example of a top view three-dimensional printer 500. The 3D printer 500 may similar to the additive manufacturing system from FIGS. 2A and 2B. The 3D printer 500 comprises a build unit, an array of printhead nozzles 240A, and an internal controller 110. The build unit comprises build chamber walls 255A, and a build bed with a sacrificial barrier 230 and an object 220. The build bed also comprises a top build material layer 265.

The array of printhead nozzles 240A may be the same as or similar to the array of nozzles 240A from FIGS. 2A and 2B, thereby comprising an array of nozzles that span substantially the full width of the build chamber. The array of printhead nozzles 240A are moveable from a first end 240A to a second end 240B (illustrated in dotted lines for clarity). The array of printhead nozzles 240A are to selectively eject a print agent on a layer of build material based on data sent from the controller 110. The array of printhead nozzles 240A may be in communication with the internal controller 110.

The controller 110 may be similar as the controller 110 from FIG. 1. The controller 110 may receive a plurality of slices of an object 220 to be generated (e.g., object data 115 from FIG. 1). The controller 110 is also to generate first print data 120 to be used to generate a plurality of layers of the object 220 based on the received object data. The controller 110 may generate second print data 130 to be used to generate a plurality of layers of the sacrificial barrier 230 to be located between the object 220 and at least one build chamber wall 255A. The controller 110 generates the second print data 130 in such a way that different parts of the sacrificial barrier are to be generated using a different set of nozzles of the array of printhead nozzles.

The controller 110 is also to instruct the array of printing nozzles to generate the object 220 based on the first print data 120, and to generate the sacrificial barrier 230 based on the second print data 130.

As disclosed above, in some examples, the controller 110 may generate the second control data 130 in such a way that a first part of the sacrificial barrier (e.g., first part 332A from FIG. 3A) in a layer is to be generated using a first set of nozzles (e.g., first set of nozzles 340A from FIG. 3A), and a second part of the sacrificial barrier (e.g., second part 332B from FIG. 3A) in the layer is to be generated using a second set of nozzles (e.g., second set of nozzles 340B from FIG. 3A). The first and second set of nozzles are different sets of nozzles from the array of printhead nozzles 240A.

As also disclosed above, in some examples, the controller 110 may generate the second control data 130 to cause a first set of nozzles (e.g., first set of nozzles 440A from FIG. 4) to generate a first portion of the barrier (e.g., first portion 432A from FIG. 4) in a first set of layers, and to cause a second set of nozzles (e.g., second set of nozzles 440B from FIG. 4) to generate a second portion of the barrier (e.g., second portion 432B from FIG. 4) in a second set of layers.

In some examples of 3D printers, the controller 110 is to define a buffer zone (not shown) in the build bed. In an example, the buffer zone may be located at the edge of the build bed. At a layer scale, the buffer zone may be a frame of build material between the chamber walls 255A and the printable area. The buffer zone may be thermally unstable as opposed to the printable area, in which the thermal conditions are stable, thereby the object 220 is to be generated in the printable area. Objects generated in the buffer zone may have dimensional, aesthetic or mechanical defects. Since the sacrificial barrier 230 is a disposable object, in some examples, the controller 110 is to generate the second control data 130 to locate the sacrificial barrier 120 in the buffer region of the build chamber.

In an example, the thickness of the horizontal cross-section of the buffer zone may be selected from the range defined by 0.1 cm to 20 cm. In another example, the thickness of the horizontal cross-section of the buffer zone may be selected from the range defined by 1 cm to 10 cm. In another example, the thickness of the horizontal cross-section of the buffer zone may be selected from the range defined by 1 cm to 5 cm. In yet another example, the thickness of the horizontal cross-section of the buffer zone may be selected from the range defined by 2 cm to 6 cm.

In some additional examples of 3D printers, it may be wanted to use a different printing configuration to generate the sacrificial barrier 230 than the printing configuration to use in the object 220. In the examples herein, the printing configuration may include the type of printing agent (e.g., composition, color) and/or the amount of printing agent to be propelled to generate the object 220 and/or the sacrificial barrier 230. In these examples, the controller 110 may instruct the array of printhead nozzles 240 to selectively eject the print agent onto a first subset of a layer of build material corresponding to the object 220 using a first printing configuration, and to eject the print agent onto a second subset of the layer of build material corresponding to the sacrificial barrier 230 using a second printing configuration.

Figure 6:
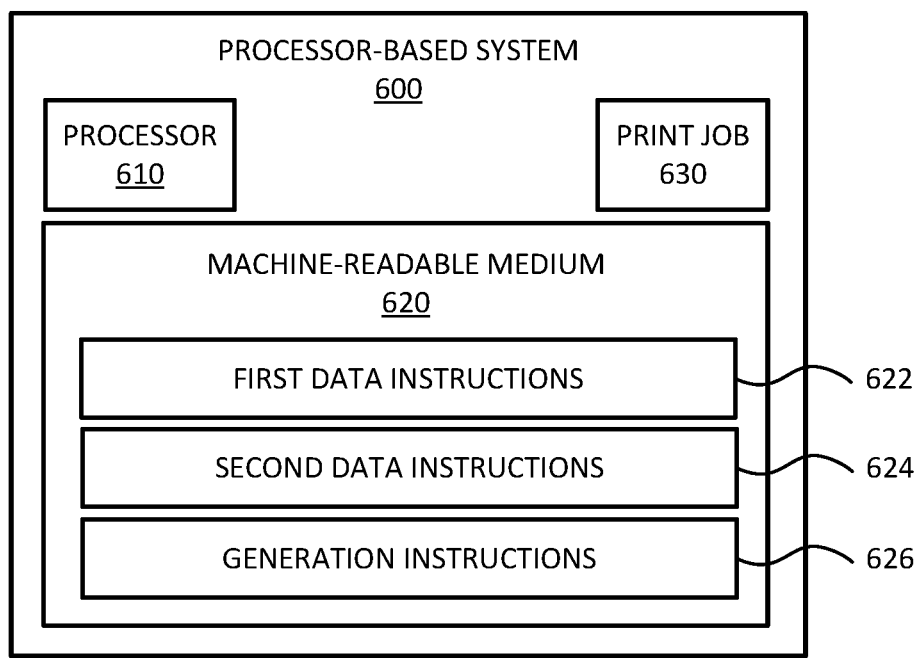
FIG. 6 is a block diagram illustrating an example of a processor-based system to generate sacrificial barriers.

FIG. 6 is a block diagram illustrating a processor-based system 600 that includes a machine-readable medium 620 encoded with example instructions to generate sacrificial barriers. In some implementations, the system 600 is a processor-based system and may include a processor 610 coupled to a machine-readable medium 620. The processor 610 may include a single-core processor, a multi-core processor, an application-specific integrated circuit (ASIC), a field programmable gate array (FPGA), and/or any other hardware device suitable for retrieval and/or execution of instructions from the machine-readable medium 620 (e.g., instructions 622-626) to perform functions related to various examples. Additionally, or alternatively, the processor 610 may include electronic circuitry for performing the functionality described herein, including the functionality of instructions 622-626. With respect of the executable instructions represented as boxes in FIG. 6, it should be understood that part or all of the executable instructions and/or electronic circuits included within one box may, in alternative implementations, be included in a different box shown in the figures or in a different box not shown.

The machine-readable medium 620 may be any medium suitable for storing executable instructions, such as a random-access memory (RAM), electrically erasable programmable read-only memory (EEPROM), flash memory, hard disk drives, optical disks, and the like. In some example implementations, the machine-readable medium 620 may be a tangible, non-transitory medium, where the term "non-transitory" does not encompass transitory propagating signals. The machine-readable medium 620 may be disposed within the processor-based system 600, as shown in FIG. 6, in which case the executable instructions may be deemed "installed" on the system 600. Alternatively, the machine-readable medium 620 may be a portable (e.g., external) storage medium, for example, that allows system 600 to remotely execute the instructions or download the instructions from the storage medium. In this case, the executable instructions may be part of an "installation package". As described further herein below, the machine-readable medium may be encoded with a set of executable instructions 622-626.

The machine-readable medium is to receive data 115 corresponding to an object (e.g., object 220 from FIG. 2A-B) to be printed in a build chamber of a 3D printing system.

Instructions 622, when executed by the processor 610, may cause the processor 610 to generate first print data (e.g., first print data 120) to be used to generate a plurality of layers of the object.

Instructions 624, when executed by the processor 610, may cause the processor 610 to generate second print data (e.g., second print data 230) to be used to generate a plurality of layers of a sacrificial barrier (e.g., sacrificial barrier 230) to be located between the object and the at least one build chamber wall, where the second print data is generated such that different parts of the sacrificial barrier are to be generated using a different set of nozzles of an array of printhead nozzles (e.g., array of printhead nozzles 240A) installed in the 3D printing system.

Instructions 626, when executed by the processor 610, may cause the processor 610 to control a 3D printing system to generate the 3D printing system to generate the object and the sacrificial barrier based on the first and second data.

In some examples, the machine-readable medium 620 may be encoded with an additional set of executable instructions to generate the second print data. For example, the machine readable medium 620 may comprise instructions that, when executed by the processor 610, may cause the processor 610 to generate the second control data in such a way that a first part of the sacrificial barrier (e.g., first part 332A from FIG. 3A) in a layer is to be generated using a first set of nozzles (e.g., first set of nozzles 340A from FIG. 3A), and a second part of the sacrificial barrier (e.g., second part 332B from FIG. 3A) in the layer is to be generated using a second set of nozzles (e.g., second set of nozzles 340B from FIG. 3A), wherein the first and second set of nozzles are different sets of nozzles from the array of printhead nozzles. Additionally, or alternatively, the machine readable medium 620 may comprise instructions that, when executed by the processor 610, may cause the processor 610 to generate the second control data to cause a third set of nozzles (e.g., first set of nozzles 440A from FIG. 4) to generate a first portion of the barrier (e.g., first portion 432A from FIG. 4) in a first set of layers, and to cause a fourth set of nozzles (e.g., second set of nozzles 440B from FIG. 4) to generate a second portion of the barrier (e.g., second portion 432B from FIG. 4) in a second set of layers.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

As used herein, the term "about" and "substantially" are used to provide flexibility to a numerical range endpoint by providing that a given value may be, for example, an additional 20% more or an additional 20% less than the endpoints of the range. The degree of flexibility of this term can be dictated by the particular variable and would be within the knowledge of those skilled in the art to determine based on experience and the associated description herein.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A system comprising a controller to:
receive data corresponding to an object to be generated or a plurality of slices of the object to be generated by a 3D printer, wherein the 3D printer comprises an array of printhead nozzles to selectively eject a print agent on a layer of build material in a build chamber having at least one build chamber wall, the array of printhead nozzles spanning substantially the full width of the build chamber and moveable along a length of the build chamber;
generate first print data to be used to generate a plurality of layers of the object based on the received object data;
generate second print data to be used to generate a plurality of layers of a sacrificial barrier to be located between the object and at least one build chamber wall, where the second print data is to be generated such that different parts of the sacrificial barrier are to be generated using a different plurality of nozzles of the array of printhead nozzles.

Feature set 2: A system with feature set 1, wherein the controller is to instruct the array of printing nozzles to generate the object based on the first print data and to generate the sacrificial barrier based on the second print data.

Feature set 3: A system with any preceding feature set 1 or 2, wherein the controller is to is to generate the second control data in such a way that a first part of the sacrificial barrier in a layer is to be generated using a first set of nozzles and a second part of the sacrificial barrier in the layer is to be generated using a second set of nozzles, wherein the first and second set of nozzles are a different sets of nozzles.

Feature set 4: A system with any preceding feature set 1 to 3, wherein the controller is to generate the second control data to generate a sacrificial barrier having a cross-section in the form of a triangle wave, a sinewave, a square wave, or a combination thereof.

Feature set 5: A system with any preceding feature set 1 to 4, wherein the controller is to generate the second control data to cause a first set of nozzles to generate a first portion of the barrier in a first set of layers and to cause a second set of nozzles to generate a second portion of the barrier in a second set of layers.

Feature set 6: A system with any preceding feature set 1 to 5, wherein the controller is to generate the second control data in such a way that a length of the cross-section of the sacrificial barrier from the first set of layers are longer than a length of the cross-section of the sacrificial barrier in the second set of layers, wherein the first set of layers are in a lower position with respect to a vertical axis than the second set of layers.

Feature set 7: A system with any preceding feature set 1 to 6, wherein the controller is part of a computing device outside of a three-dimensional printer.

Feature set 8: A system with any preceding feature set 1 to 7, wherein the sacrificial barrier encloses at least in part the object to be generated.

Feature set 9: A three-dimensional printer comprising:
an array of printhead nozzles to selectively eject a print agent on a layer of build material in a build chamber having at least one build chamber wall, the array of printhead nozzles spanning substantially the full width of the build chamber and moveable along a length of the build chamber; and
a controller to:
receive data corresponding to an object to be generated or a plurality of slices of the object to be generated,
generate first print data to be used to generate a plurality of layers of the object based on the received object data,
generate second print data to be used to generate a plurality of layers of a sacrificial barrier to be located between the object and the at least one build chamber wall, where the second print data is to be generated such that different parts of the sacrificial barrier are to be generated using a different set of nozzles of the array of printhead nozzles, and
instruct the array of printing nozzles to generate the object based on the first print data and the sacrificial barrier based on the second print data.

Feature set 10: A three-dimensional printer with feature set 9, wherein the controller is to generate the second control data in such a way that a first part of the sacrificial barrier in a layer is to be generated using a first set of nozzles and a second part of the sacrificial barrier in the layer is to be generated using a second set of nozzles, wherein the first and second set of nozzles are a different sets of nozzles from the array of printhead nozzles.

Feature set 11: A three-dimensional printer with any preceding feature set 9 or 10, wherein the controller is to generate the second control data to cause a first set of nozzles to generate a first portion of the barrier in a first set of layers and to cause a second set of nozzles to generate a second portion of the barrier in a second set of layers.

Feature set 12: A three-dimensional printer with any preceding feature set 9 to 11, wherein the controller is to generate the second control data to locate the sacrificial barrier in a buffer region of the build chamber.

Feature set 13: A three-dimensional printer with any preceding feature set 9 to 12, wherein the controller is to instruct the array of printhead nozzles to selectively eject the print agent onto a first subset of a layer of build material corresponding to the object using a first printing configuration and to eject the print agent onto a second subset of the layer of build material corresponding to the sacrificial barrier using a second printing configuration.

Feature set 14: A non-transitory machine-readable medium storing instructions executable by a processor, wherein the medium is to receive data corresponding to an object to be printed in a build chamber of a 3D printing system, the non-transitory machine-readable medium comprising:
  instructions to generate first print data to be used to generate a plurality of layers of the object;
  instructions to generate second print data to be used to generate a plurality of layers of a sacrificial barrier to be located between the object and the at least one build chamber wall, where the second print data is generated such that different parts of the sacrificial barrier are to be generated using a different set of nozzles of an array of printhead nozzles installed in the 3D printing system; and
  instructions to control the 3D printing system to generate the object and the barrier based on the first and second data.

Feature set 15: A non-transitory machine-readable medium with feature set 14, wherein the instructions to generate the second print data further comprises:
  instructions to generate the second control data in such a way that a first part of the sacrificial barrier in a layer is to be generated using a first set of nozzles and a second part of the sacrificial barrier in the layer is to be generated using a second set of nozzles, wherein the first and second set of nozzles are a different sets of nozzles from the array of printhead nozzles; and/or
  instructions to generate the second control data to cause a third set of nozzles to generate a first portion of the barrier in a first set of layers and to cause a fourth set of nozzles to generate a second portion of the barrier in a second set of layers.

The invention claimed is:

1. A system comprising:
  a controller configured to:
    receive data corresponding to an object to be generated or a plurality of slices of the object to be generated by a 3D printer, wherein the 3D printer comprises an array of printhead nozzles to selectively eject a print agent on a layer of build material in a build chamber having a build bed and at least one build chamber wall, the array of printhead nozzles spanning substantially the full width of the build chamber and moveable along a length of the build chamber;
    generate first print data configured to generate a plurality of layers of the object based on the received object data;
    generate second print data configured to generate a plurality of layers of a sacrificial barrier to be located between the object and the at least one build chamber wall, the sacrificial barrier not part of the object and not to be in contact with the object when generated, where the second print data is to be generated such that different parts of the sacrificial barrier are to be generated using a different plurality of nozzles of the array of printhead nozzles; and
    instruct the array of printing nozzles to generate, using the build material, the object based on the first print data and the sacrificial barrier based on the second print data, the sacrificial barrier inhibiting agitation of the build material due to friction of the build bed with the at least one build chamber wall from causing defects in the object during generation of the object.

2. The system of claim 1, wherein the controller is configured to initiate transfer of the build bed to a cooling station at which the build bed is cooled to separate non-fused build material from the object that has been generated, the sacrificial barrier mitigating effects of the agitation of the build material due to the friction of the build bed with the at least one chamber wall during the transfer.

3. The system of claim 1, wherein the controller is configured to generate the second control data such that a first part of the sacrificial barrier in a layer is to be generated using a first set of nozzles and a second part of the sacrificial barrier in the layer is to be generated using a second set of nozzles, wherein the first and second set of nozzles are a different sets of nozzles.

4. The system of claim 3, wherein the controller is configured to generate the second control data to generate a sacrificial barrier having a cross-section in the form of a triangle wave, a sinewave, a square wave, or a combination thereof.

5. The system of claim 1, wherein the controller configured is to generate the second control data to cause a first set of nozzles to generate a first portion of the barrier in a first set of layers and to cause a second set of nozzles to generate a second portion of the barrier in a second set of layers.

6. The system of claim 5, wherein the controller is configured to generate the second control data in such a way that a length of the cross-section of the sacrificial barrier from the first set of layers are longer than a length of the cross-section of the sacrificial barrier in the second set of layers, wherein the first set of layers are in a lower position with respect to a vertical axis than the second set of layers.

7. The system of claim 1, wherein the controller is part of a computing device outside of a three-dimensional printer.

8. The system of claim 1, wherein the sacrificial barrier surrounds the object to be generated.

9. The system of claim 1, wherein the controller is to generate the second print data to locate the sacrificial barrier in a buffer region of the build chamber located at an edge of the build bed and that is thermally unstable.

10. A three-dimensional printer comprising:
  an array of printhead nozzles to selectively eject a print agent on a layer of build material in a build chamber having a build bed and at least one build chamber wall, the array of printhead nozzles spanning substantially the full width of the build chamber and moveable along a length of the build chamber; and
  a controller configured to:
    receive data corresponding to an object to be generated or a plurality of slices of the object to be generated,
    generate first print data configured to generate a plurality of layers of the object based on the received object data,
    generate second print data configured to generate a plurality of layers of a sacrificial barrier to be located between the object and the at least one build chamber wall, the sacrificial barrier not part of the object and not to be in contact with the object when generated, where the second print data is to be generated such that different parts of the sacrificial barrier are to be generated using a different set of nozzles of the array of printhead nozzles, and instruct the array of printing nozzles to generate, using the build material, the object based on the first print data and the sacrificial barrier based on the second print data, the sacrificial barrier inhibiting agitation of the build material due to friction of the build bed with the at least one build chamber wall from causing defects in the object during generation of the object.

11. The three-dimensional printer of claim 10, wherein the controller is to generate the second control data such that a first part of the sacrificial barrier in a layer is to be generated using a first set of nozzles and a second part of the sacrificial barrier in the layer is to be generated using a second set of nozzles, wherein the first and second set of nozzles are a different sets of nozzles from the array of printhead nozzles.

12. The three-dimensional printer of claim 10, wherein the controller is to generate the second control data to cause a first set of nozzles to generate a first portion of the barrier in a first set of layers and to cause a second set of nozzles to generate a second portion of the barrier in a second set of layers.

13. The three-dimensional printer of claim 10, wherein the controller is to generate the second control data to locate the sacrificial barrier in a buffer region of the build chamber located at an edge of the build bed that is thermally unstable.

14. The three-dimensional printer of claim 10, wherein the controller is to instruct the array of printhead nozzles to selectively eject the print agent onto a first subset of a layer of build material corresponding to the object using a first printing configuration and to eject the print agent onto a second subset of the layer of build material corresponding to the sacrificial barrier using a second printing configuration.

15. The three-dimensional printer of claim 10, wherein the controller is configured to initiate transfer of the build bed to a cooling station at which the build bed is cooled to separate non-fused build material from the object that has been generated, the sacrificial barrier mitigating effects of the agitation of the build material due to the friction of the build bed with the at least one chamber wall during the transfer.

16. A non-transitory machine-readable medium storing instructions executable by a processor, wherein the medium is to receive data corresponding to an object to be printed in a build chamber of a 3D printing system having a build bed and at least one build chamber wall, the non-transitory machine-readable medium comprising:

instructions configured to generate first print data configured to generate a plurality of layers of the object;

instructions configured to generate second print data configured to generate a plurality of layers of a sacrificial barrier to be located between the object and the at least one build chamber wall, the sacrificial barrier not part of the object and not to be in contact with the object when generation, where the second print data is generated such that different parts of the sacrificial barrier are to be generated using a different set of nozzles of an array of printhead nozzles installed in the 3D printing system; and instructions configured to control the 3D printing system to generate, using build material, the object and the barrier based on the first and second data, the sacrificial barrier inhibiting agitation of the build material due to friction of the build bed with the at least one build chamber wall from causing defects in the object during generation of the object.

17. The non-transitory machine-readable medium of claim 16, wherein the instructions configured to generate the second print data further comprises:

instructions configured to generate the second control data such that a first part of the sacrificial barrier in a layer is to be generated using a first set of nozzles and a second part of the sacrificial barrier in the layer is to be generated using a second set of nozzles, wherein the first and second set of nozzles are a different sets of nozzles from the array of printhead nozzles;

and/or instructions configured to generate the second control data to cause a third set of nozzles to generate a first portion of the barrier in a first set of layers and to cause a fourth set of nozzles to generate a second portion of the barrier in a second set of layers.

18. The non-transitory machine-readable medium of claim 16, further comprising:

instructions configured to initiate transfer of the build bed to a cooling station at which the build bed is cooled to separate non-fused build material from the object that has been generated, the sacrificial barrier mitigating effects of the agitation of the build material due to the friction of the build bed with the at least one chamber wall during the transfer.

19. The non-transitory machine-readable medium of claim 16, wherein the instructions configured to generate the second print data further comprises:

instructions configured to generate to locate the sacrificial barrier in a buffer region of the build chamber located at an edge of the build bed and that is thermally unstable.

* * * * *